Patented Dec. 4, 1934

1,982,788

UNITED STATES PATENT OFFICE 1,982,788

SYNTHETIC RESIN

Oscar A. Cherry, Chicago, Ill., assignor to Economy Fuse and Manufacturing Company, Chicago, Ill., a corporation of New York No Drawing. Application September 6, 1932, Serial No. 631,888

4 Claims. (Cl. 260—8)

This invention relates to a new and useful synthetic resin and to the process of producing same.

It is an object of this invention to provide a new and improved resin possessing properties and characteristics heretofore non-existent in known resins and which is usable in various commercial applications with new and improved results.

It is a further object of this invention to provide a process for producing the novel resin above referred to.

These and other objects not specifically enumerated are contemplated for this invention as will readily occur to one skilled in the art as the following description proceeds.

It is well known to prepare synthetic resins of the ester type by the reaction of polybasic acids with polyhydric alcohols. and these resins possess properties which make them of considerable commercial importance.

However, it has been found necessary, for many applications, to modify these resins in order to obtain certain properties of solubility and/or flexibility. The usual method of modification consists in forming a mixed ester of a polybasic and monobasic acid and a polyhydric alcohol. The monobasic acids usually chosen are abietic anhydride (rosin) or the fatty acids derived from vegetable oils. For example, mixed glycerides of phthalic anhydride and rosin form an important synthetic resin.

It is also known to modify the solubility behavior of phenol-aldehyde resins by heating the phenol resins with rosin to presumably esterify the phenolic hydroxyl group and thereafter to esterify the excess of rosin with glycerol.

These two types of resin have certain advantages. The ester type, namely the phthalic anhydride-rosin-glycerol complexes, are somewhat tougher than the modified phenol resin type but for certain light colored varnishes the phenol resins are to be preferred.

For certain applications, as for example, as the resin constituent of a cellulose acetate lacquer, neither are suitable since they are not perfectly compatible with the cellulose acetate. Both are compatible to some extent with the cellulose nitrate used in lacquers, the ester type being the better suited in a large number of cases.

It is now found possible to prepare a resin possessing the valuable properties of both of the above types of resins and in addition possessing properties heretofore unobtainable in either. These desirable technical results can be obtained by forming a mixed glyceride of a polybasic acid and a resin acid, wherein the polybasic acid possesses structural and solubility relationships to a phenol resin. The polybasic acid best suited for this purpose is dihydroxydiphenylmethane dicarboxylic acid. This acid is easily obtained by the condensation of salicylic acid with formaldehyde.

In practice it is preferred to use known methods for the preparation of this acid. As an example, two molecular weights of salicylic acid are heated under a reflux condenser with one and one third molecular weights of 40 per cent formaldehyde in the presence of one fourth molecular weight of concentrated hydrochloric acid until the oily liquid first formed solidifies. The product may be used without any especial purification other than washing and drying. The acid is a white powder melting at about 238 degrees C. It is completely soluble in acetone.

Illustrations will be given of ways in which this acid may be used in the preparation of synthetic resin esters. It is to be understood of course, that the examples given are purely illustrative and are not to be considered in a limiting sense. The possible variations are extremely numerous and a large number of variations productive of valuable technical results will be apparent to those skilled in the art from a study of the examples.

Two hundred and eighty-eight grams of the dihydroxydiphenylmethane dicarboxylic acid, prepared as above described or by any other suitable method, are reacted with 123 grams of glycerol to form a clear, nearly colorless, soft, sticky partial ester containing unesterified alcoholic hydroxyl groups. It will be noted that on account of the high molecular weight of the acid that the acid in weight and volume is in excess of the glycerol. It has been found that burning of the ester and/or acid by local overheating can be prevented by adding the acid to the glycerol in successive small portions allowing solution and partial reaction of each portion to occur before addition of the next portion.

To the soft resin so prepared is added six hundred grams rosin and the whole heated to 290 degrees C. for about fifteen minutes in an open vessel or a vessel equipped with an air cooled reflux condenser of such length that glycerol vapor is returned to the reaction mass and the water vapor is allowed to escape. The resulting product is a clear resin, brittle at ordinary room temperatures, and soluble in fatty oils, esters, acetone and benzol. It is only slightly soluble in alcohol. This resin is compatible with both nitric and acetic esters of cellulose and may be used in lacquers having either of these esters as their base. The acid number of the product will vary with the duration of heating. Acid numbers as low as 12 have been obtained by comparatively short heating. In the above example 300 grams of the fatty acid derived from China-wood oil may be substituted for 300 grams of rosin to produce a somewhat tougher resin.

As an alternative a synthetic resin may be produced in the manner above described from one molecular weight of dihydroxydiphenylmethane dicarboxylic acid, two molecular weights of glycerol and four molecular weights of rosin. Or 300 grams of gum Kauri may be substituted for one molecular weight of rosin with the production of a considerably harder resin possessing somewhat less solubility in the ordinary lacquer solvents.

Other dibasic or monobasic acids may be used in conjunction with the above named acids. Other polyhydric alcohols may be substituted for the glycerol used in the above examples.

There are obvious equivalents for the dihydroxydiphenylmethane dicarboxylic acid, such as for example, other hydroxydibasic acids of the diphenylmethane series.

It will be noted that this new synthetic resin contains as a part of its molecule the hydroxy diphenylmethane group characteristic of phenol-formaldehyde condensation products. It also contains the complex ester groupings characteristic of the so-called glyptal resins. It will also be noted that unlike the Albertols all of the rosin acid radicals are constituent parts of the resin molecule. In the Albertols since a large excess of rosin is used and the excess subjected subsequently to esterification, a large part of the rosin ester is present as a component of a mixture.

Applicant is aware of German Patent No. 372,933 of Class 12 q, Group 20, wherein the esterification of dihydroxydiphenylmethane dicarboxylic acid with simple alcohols is described. Nowhere, however, as far as applicant is aware, is it taught to produce a synthetic resin having the properties or the chemical constitution of this new resin.

It is to be understood that the term "polyhydric alcohol" as used in this specification is to be construed to include a mixture of said alcohols.

I claim:

1. The process of preparing a synthetic resin comprising reacting a dihydroxydiphenylmethane dicarboxylic acid, a monobasic carboxylic acid, and glycerol.

2. The process of preparing a synthetic resin comprising reacting a dihydroxydiphenylmethane dicarboxylic acid, a natural resin acid, and glycerol.

3. The process of preparing a synthetic resin comprising reacting a dihydroxydiphenylmethane dicarboxylic acid, a drying oil fatty acid, and glycerol.

4. A synthetic resin comprising a mixed glyceride of a dihydroxydiphenylmethane dicarboxylic acid, and a monobasic carboxylic acid characterized in that it is compatible with cellulose nitrate.

OSCAR A. CHERRY.